United States Patent
Bohn et al.

(10) Patent No.: US 6,595,549 B2
(45) Date of Patent: Jul. 22, 2003

(54) GAS BAG MODULE

(75) Inventors: Stefan Bohn, Goldbach (DE); Joachim Fellhauer, Nilkheim (DE)

(73) Assignee: TRW Automotive Safety Systems GmbH & Co., KG, Aschaffenburg (DE)

(*) Notice: Subject to any disclaimer, the term of this patent is extended or adjusted under 35 U.S.C. 154(b) by 0 days.

(21) Appl. No.: 09/903,021

(22) Filed: Jul. 11, 2001

(65) Prior Publication Data

US 2002/0005632 A1 Jan. 17, 2002

(30) Foreign Application Priority Data

Jul. 13, 2000 (DE) .......................... 200 12 077
Dec. 28, 2000 (DE) .......................... 100 65 465

(51) Int. Cl.$^7$ ................................ B60R 21/16
(52) U.S. Cl. ................................ 280/743.1
(58) Field of Search .................. 280/728.2, 730.1, 280/732, 743.1, 743.2, 728.3, 731

(56) References Cited

U.S. PATENT DOCUMENTS

| 4,449,728 A | * | 5/1984 | Pilatzki ........................ 280/731 |
| 4,828,286 A | * | 5/1989 | Fohl ............................ 280/731 |
| 5,048,863 A | * | 9/1991 | Henseler et al. ............. 188/376 |
| 5,125,682 A | * | 6/1992 | Hensler et al. ............. 280/730.1 |
| 5,308,113 A | * | 5/1994 | Moriset ...................... 280/743.2 |
| 5,362,101 A | * | 11/1994 | Sugiura et al. ............ 280/728.2 |
| 5,489,119 A | * | 2/1996 | Prescaro et al. .......... 280/730.1 |
| 5,678,858 A | * | 10/1997 | Nakayama et al. ....... 280/728.2 |
| 6,164,696 A | * | 12/2000 | Ellerbrok et al. ............ 280/729 |

FOREIGN PATENT DOCUMENTS

| DE | 3630685 A1 | 2/1988 |
| DE | 19781051 T1 | 12/1998 |
| DE | 19749914 A1 | 5/1999 |
| WO | WO9631370 | 10/1996 |
| WO | WO9734753 | 9/1997 |

* cited by examiner

Primary Examiner—Paul N. Dickson
Assistant Examiner—Faye M. Fleming
(74) Attorney, Agent, or Firm—Tarolli, Sundheim, Covell & Tummino L.L.P.

(57) ABSTRACT

A gas bag module comprises a gas bag which has a front wall for the impact of an occupant. The gas bag is formed by a gas bag wall of several fabric parts. At least one of the fabric parts forms the front wall having an opening from which, in an inflated state of the gas bag, a depression originates, which is formed in that a center section of the gas bag wall on inflation is prevented from a free movement and is held back. The gas bag has around the depression an annular chamber which is to be filled. The opening is constructed in a slit shape.

10 Claims, 3 Drawing Sheets

GAS BAG MODULE

TECHNICAL FIELD

The invention relates to a gas bag module for restraining an occupant of a vehicle.

BACKGROUND OF THE INVENTION

Annular gas bags have the advantage that the center section is prevented from a movement towards the occupant by remaining fastened to the module. The restraint is then effected by means of the annular front wall around the depression. The depression itself is not filled with gas and is open towards the exterior. Such gas bags, which as front gas bags are either housed in the steering wheel or in the instrument panel, also are expected to have excellent restraint values. The depression is to be as small as possible to have a large surface for restraining the occupant.

BRIEF SUMMARY OF THE INVENTION

The invention provides a gas bag module, more precisely a front bag module for restraining an occupant in the case of a front impact, in which module the depression at least partially, preferably even completely closes itself. The gas bag module according to the invention comprises a gas bag which has a front wall for the impact of an occupant. The gas bag is formed by a gas bag wall of several fabric parts. At least one of the fabric parts forms the front wall with an opening from which, in an inflated state of the gas bag, a depression originates, which depression is formed in that a center section of the gas bag wall on inflation is prevented from a free movement and is held back. The gas bag has around the depression an annular chamber which is to be filled. The opening is constructed in a slit shape.

Whereas in so-called annular gas bags known hitherto, the opening in the front wall was always in the form of a circle, the invention makes provision to construct this as a slit, so that the cut of the front wall brings about the closing of the depression.

According to the preferred embodiment, the slit is straight-lined and elongated.

However, furthermore, it can also be constructed in a V-, T-, H-shape, in the form of a double T or in a cross shape.

Furthermore, a C-shaped slit can also be provided.

According to the preferred embodiment, the cut of the fabric parts and the geometry of the opening are coordinated with each other such that the depression in the vicinity of the opening is at least almost, preferably completely closed in the fully inflated state of the gas bag, by sections of the fabric part defining the depression lying against each other.

The gas bag therefore preferably closes by itself close to the opening, the fabric parts being able to lie against each other over a large area in the region of the depression, so that in the inflated state the depression is no longer visible.

In order to further support the closing, it is possible to provide a holding means at the sections which lie against each other, which holding means holds the sections against each other on contact. Such a holding means can, for example be a hook and eye closure or VELCRO™ tape or other holding or bonding elements. The background to this embodiment is as follows. The unfolding process is a dynamic process. The gas bag will first unfold radially obliquely outwards, so that the slit becomes a large opening. Then the fabric parts which form the depression fall radially inwards and opposite sections of the fabric parts strike onto each other. The depression is now closed. However, a rebounding of the fabric can occur, so that the depression is opened again. This process can even lead to a certain pulsing of the depression, i.e. a repeated opening and closing. So that it is achieved that a closed front wall is available as impact surface for the occupant, the holding means is provided, which is to eliminate the pulsing.

In the gas bag module according to the invention, it is to be noted that the module covering frees an annular outlet opening, whereby a central part of the covering, which lies over the center section, is not moved outwards on opening of the covering.

DETAILED DESCRIPTION OF PREFERRED EMBODIMENTS

Figure 1:
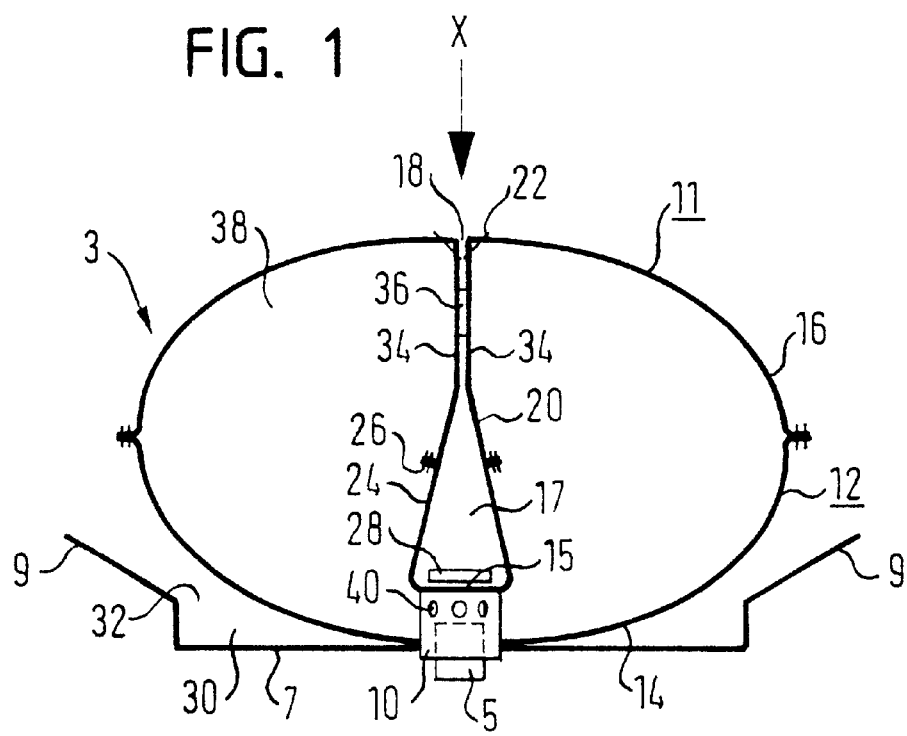
FIG. 1 shows a cross-sectional view through an embodiment of the gas bag module according to the invention.

In FIG. 1 a gas bag module is illustrated, which has a gas bag 3, a gas generator 5 and a module housing 7 with a module covering 9. The gas generator 5 is surrounded by a cup- or bell-shaped diffuser 10, which is turned over the gas generator 5 from above and is fastened to the module, more precisely to the module housing 7. The gas bag has a gas bag wall which has several sections and consists of several fabric parts. A front wall 11 faces the occupant in the inflated state; it is this front wall which the occupant can hit. Furthermore, a rear wall 12 is provided. A depression 17, which is not filled with gas, extends from the front wall 11 in the middle of the gas bag, i.e. in the center, in the direction of the gas generator 5.

The gas bag 3 consists substantially of four fabric parts which are all constructed in a ring shape. A fabric part 14 forms the rear wall 12, another fabric part 16 the front wall 11. The fabric part 16 has an opening 18 which is arranged in the center of the gas bag and forms the transition to the depression. A fabric part 20 is sewn to the fabric part 16 at the rim of the opening, the corresponding seam being designated by 22. A fourth fabric part 24 is sewn firmly to the fabric part 20 with a seam 26 and has the center section 15, which lies against the diffuser 10 and is fastened thereto.

The module covering has a central part 28 which lies above the center section 15 and is likewise permanently fastened to the diffuser 10. To fasten this central part 28, inside the central part a reinforcement plate is provided, from which threaded bolts project which protrude through the center section 15 and the diffuser 10, in order to be bolted from below with nuts. The center section 15 together with the central part 28 are thereby permanently fastened to the diffuser and are prevented from a movement on activation of the gas bag module.

The gas bag 3 is housed in the folded state in an annular space 30 between the diffuser 10 and the outer wall of the module housing 7. Next to the central part, the covering 9 has an annular flap construction composed of several segments, which covers an annular outlet opening 32 in the not yet activated state of the gas generator.

As can be seen in FIG. 1, the depression 17 is closed in the vicinity of the opening 18 in that opposite sections 34 of the gas bag wall, more precisely of the fabric part 20, lie against each other.

In order that these sections 34 are held permanently against each other already on their first contact, a holding means in the form of a hook and eye closure or VELCRO™ 36 is arranged on the inner face on the opposite sections.

However, the cut of the fabric parts and the geometry of the opening 18 can be coordinated with each other such that the depression 17 is closed immediately adjoining the opening 18 in the fully inflated state of the gas bag.

The illustrated gas bag 3 is a so-called front gas bag which is intended to protect the occupant in a frontal impact and is housed in the steering wheel or in the instrument panel.

In the case of restraint, gas is blown from the gas generator 5 into the interior of the gas bag, into the annular chamber 38 which is constructed there, which surrounds the depression 17. The gas bag unfolds upwards, towards the occupant, and presses open the covering 9. The central part 28 remains. The gas bag moves out of the module through the annular outlet opening 32 and, owing to the radially directed outflow openings 40 in the diffuser, moves obliquely outwards in a tapered form, in order to then spread out inwards during the further inflation process. As soon as the sections 34 touch each other for the first time, they remain fastened to each other owing to the Velcro closure 36. The center section 15 is prevented from any movement and is held back.

The closing of the depression 17 as close as possible to the opening 18 is brought about principally by a suitable cut of the fabric part 16.

Possibilities for this cut can be seen in the following figures, showing a view in the direction of the arrow X onto the gas bag in the spread out state, i.e. in the non-inflated, non-folded state. However, it is to be stressed that except for a certain folding, the correspondingly constructed gas bags in the fully inflated state, looking onto the front wall, have exactly the same appearance as illustrated in the following figures.

To support the closing of the depression 17, the opening 18 in the front wall 11, more precisely in the fabric part 16, is not constructed in the form of a circular ring, but rather is slit-shaped. According to FIG. 2, the slit is elongated and straight-lined, the length of the slit L being more than five times as great as the width B of the slit.

Figure 2:
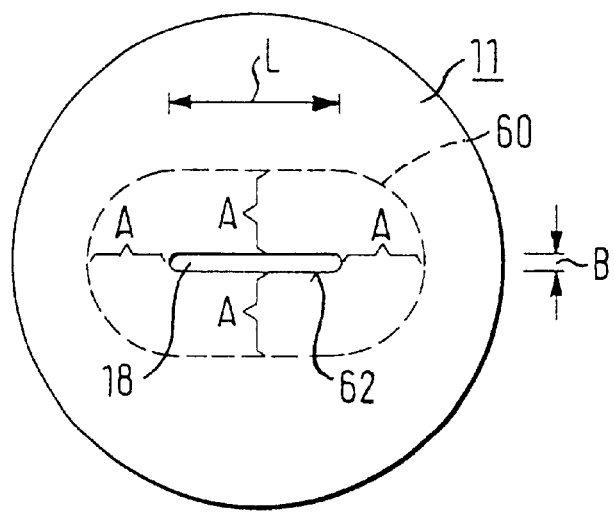
FIGS. 2 to 8 show top views onto the front wall according to various embodiments.

In FIG. 2 it is in fact illustrated that the opening 18 is formed by cutting out a slit, i.e. cutting out a fabric part, but it can also be formed in that only one elongated cut is provided through the fabric part 16. The spread-out fabric part 20, sewn to the edge 62 of the opening 18, is illustrated by broken lines. It can readily be seen that the outer edge 60 of the fabric part 20 is always at the same distance A from the edge 62 of the opening 18. Thereby, it is to be achieved that the movement of the entire edge 62 contrary to the direction of the arrow X in FIG. 1 is delimited uniformly by the fabric parts 20, 24. The fabric parts 20, 24 in fact act as a type of limiting strap for the edge 62.

The geometry of the slit-like opening 18 must be such that during unfolding the edge 62 can slide along the central part 28 in the direction outwards. Therefore, the surrounding length of the edge 62 must be slightly greater than the periphery of the central part 28, which is normally in the shape of a circular ring.

Figure 3:
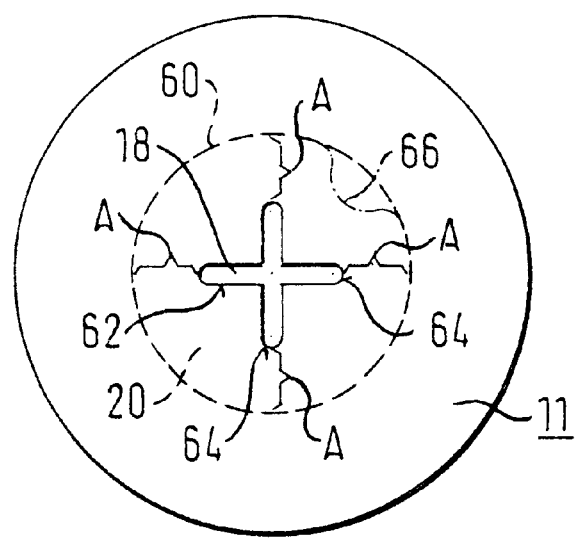

FIG. 3 shows a cross-shaped slit, forming the opening 18, the radially outermost points 64 of which always have the same distance from the edge 60 of the fabric part 20, so that again at least the majority of the edge 62 is held back at the same distance from the diffuser 10. The fact that the edge 60 between the outermost points 64 does not have a depression following the cross shape provides for an excess of fabric wall in the region of the depression, which supports and ensures a touching of sections 34 against each other. Furthermore, however, it is also entirely conceivable that, as illustrated by dot-and-dash lines, in addition corresponding depressions are provided between the outermost points 64 on the edge 60. Only one such depression is illustrated by way of example, which bears the reference number 66.

Figure 4:
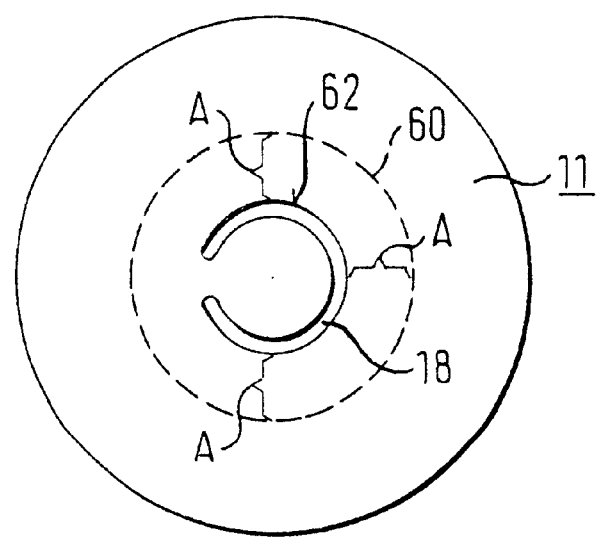

In the embodiment according to FIG. 4, the opening 18 is constructed in the form of a C-shaped slit. The edge 60 is circular and has a uniform distance A from the edge 60.

Figure 5:
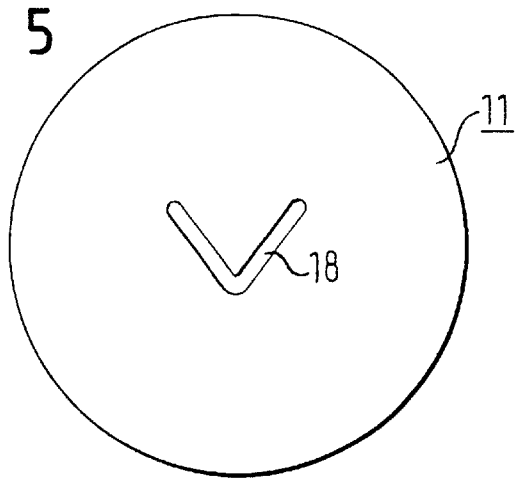
Figure 6:
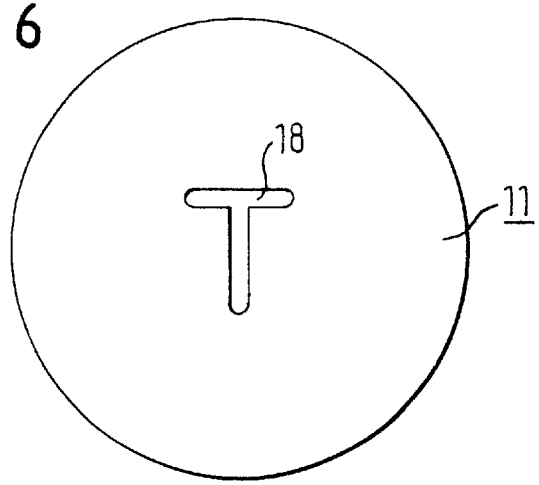
Figure 7:
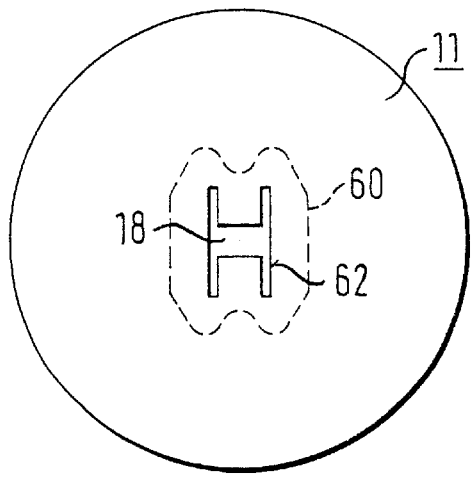
Figure 8:
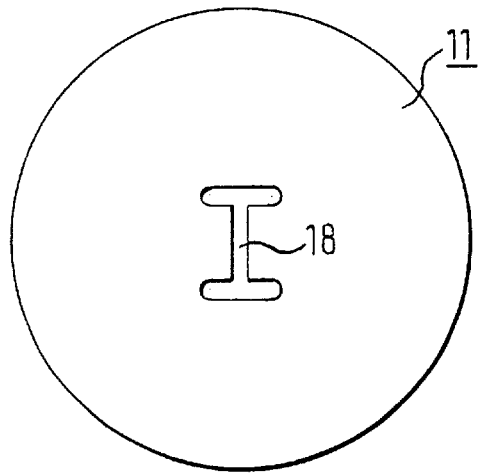

In the embodiment according to FIG. 5, the opening 18 is a V-shaped slit, in the embodiment according to FIG. 6 it is a T-shaped slit, in the embodiment according to FIG. 7 an H-shaped slit and in the embodiment according to FIG. 8 the slit has the form of a double "T".

In FIGS. 5, 6 and 8 the fabric parts 20 are not illustrated, only in FIG. 7. FIG. 7 shows an edge 60 running in a type of butterfly shape.

What is claimed is:

1. A gas bag module comprising an inflatable gas bag having a front wall for the impact of an occupant, said gas bag being formed by a gas bag wall, said gas bag wall being made of several fabric parts, at least one of said fabric parts forming said front wall, said front wall having a through opening extending through said front wall and from which, in an inflated state of said gas bag, a depression originates, said through opening being constructed in a slit shape in a top view of said front wall, said gas bag, in said inflated state, having a filled annular chamber extending around said depression, said depression being formed in that, upon inflation of said gas bag, a center section of said gas bag wall is prevented from any free movement.

2. The gas bag module according to claim 1 wherein said slit is straight-lined and elongated in a top view of said front wall.

3. The gas bag module according to claim 1 wherein said slit in a top view of said front wall is constructed in a shape selected from the group consisting of a V shape, a T shape, an H shape and a cross shape.

4. The gas bag module according to claim 1 wherein said slit in a top view of said front wall is C-shaped.

5. The gas bag module according to claim 1 wherein said depression is defined by one of said fabrics parts, said fabric parts having a shape and said through opening having a geometry which are coordinated with each other such that, in said inflated state of said gas bag, said depression is at least almost closed in the vicinity of said through opening by sections of said depression defining fabric part facing each other.

6. The gas bag module according to claim 5 wherein on said sections of said depression defining fabric part facing each other, a holding means is provided which holds said sections against each other on contact.

7. The gas bag module according to claim 6 wherein said holding means is a hook and eye closure.

8. The gas bag module according to claim 1 wherein said depression is defined by one of said fabric parts, said through opening in said front wall at least at radially outermost points having an equal radial distance from an edge of said depression defining fabric part.

9. The gas bag module according to claim 1 wherein one of said fabric parts is attached to said front wall and extends around said slit and has said center section.

10. A gas bag module comprising an inflatable gas bag having a front wall for the impact of an occupant, said gas bag being formed by a gas bag wall, said gas bag wall being made of said front wall sewn to a rear wall, a first fabric piece sewn to the front wall and a second fabric piece sewn to the first fabric piece, said front wall having a through opening extending through said front wall, said first fabric piece being sewn to a rim of said through opening, said first and second fabric pieces defining a depression in said gas bag wall upon inflation of said gas bag, said through opening being constructed in a slit shape in a top view of said front wall, said gas bag, in said inflated state, having a filled annular chamber defined by said gas bag wall, said chamber extending around said depression, said second fabric piece having a center section which, upon inflation of said gas bag, is prevented from any free movement and is located at the bottom of said depression.

* * * * *